(12) United States Patent
Chen (10) Patent No.: US 12,208,747 B2
(45) Date of Patent: Jan. 28, 2025

(54) NAVIGATION DISPLAY ASSEMBLY

(71) Applicant: Tong Chen, Chicago, IL (US)

(72) Inventor: Tong Chen, Chicago, IL (US)

( * ) Notice: Subject to any disclaimer, the term of this patent is extended or adjusted under 35 U.S.C. 154(b) by 137 days.

(21) Appl. No.: 18/122,227

(22) Filed: Mar. 16, 2023

(65) Prior Publication Data

US 2024/0308437 A1   Sep. 19, 2024

(51) Int. Cl.
*B60R 11/02* (2006.01)
*G01C 21/36* (2006.01)
*B60R 11/00* (2006.01)

(52) U.S. Cl.
CPC ...... *B60R 11/0235* (2013.01); *G01C 21/3647* (2013.01); *B60R 2011/0035* (2013.01); *B60R 2300/207* (2013.01)

(58) Field of Classification Search
CPC ......... B60R 11/0235; B60R 2011/0035; B60R 2300/207; G01C 21/3647
See application file for complete search history.

(56) References Cited

U.S. PATENT DOCUMENTS

| | | | |
|---|---|---|---|
| D522,943 S | 6/2006 | Opoku-Agyemang | |
| 7,413,233 B1 | 8/2008 | Jung | |
| 9,712,741 B2 | 7/2017 | Kothari | |
| 10,486,505 B2 | 11/2019 | Lee | |
| 10,556,490 B2 | 2/2020 | Li | |
| 10,583,738 B2 | 3/2020 | Gassman | |
| 2011/0057471 A1 | 3/2011 | Lane | |
| 2011/0248060 A1 | 10/2011 | Luk | |
| 2012/0092497 A1* | 4/2012 | Hoetzer | B60R 1/08 348/148 |
| 2013/0038730 A1* | 2/2013 | Peterson | B60R 1/26 348/148 |
| 2015/0360618 A1* | 12/2015 | Richard | B60R 11/0252 348/148 |

FOREIGN PATENT DOCUMENTS

WO    WO2017219728    12/2017

* cited by examiner

*Primary Examiner* — Shawn S An (57) ABSTRACT

A navigation display assembly includes a display unit which has a pair of clamps that can releasably engage a visor in a vehicle to position the display unit in front of a driver of the vehicle. The display unit includes a first panel extending downwardly from the display unit and a second panel hingedly coupled to the display unit. The second panel is positionable at an adjustable angle with respect to the first panel and the display unit projects an image onto the second panel. In this way the second panel reflects the image onto the first panel to facilitate the driver to view the image without taking their eyes off of the road while driving.

8 Claims, 9 Drawing Sheets

(In-Use View)
FIG. 7

NAVIGATION DISPLAY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to navigation devices and more particularly pertains to a new navigation device for facilitating a driver of a vehicle to view navigation imagery without taking their eyes off of the road. The device includes a display unit that is attachable to a visor in a vehicle. The display unit includes a first panel extending downwardly from the display unit and a second panel pivotally attached to the display unit. The display unit projects imagery onto the second panel and the second panel reflects the imagery onto the first panel. In this way the driver can view the imagery on the first panel without taking their eyes off of the road.

(2) Description of Related Art Including Information Disclosed Under 37 CFR 1.97 and 1.98

The prior art relates to navigation devices including a display device that includes a pivot integrated into a visor of a vehicle, a hinge attached to the pivot and a display panel attached to the hinge. The prior art discloses a vehicle visor device that includes a pair of touch screens that are each integrated into a respective one of a pair of sun visors in a vehicle. The prior art discloses a display sun visor that includes a traffic light detector which receives a global positioning system signal to determine a signal status of a traffic light. The prior art discloses a variety of vehicle sun visors that includes an electronic display integrated into a sun visor of a vehicle.

BRIEF SUMMARY OF THE INVENTION

An embodiment of the disclosure meets the needs presented above by generally comprising a display unit which has a pair of clamps that can releasably engage a visor in a vehicle to position the display unit in front of a driver of the vehicle. The display unit includes a first panel extending downwardly from the display unit and a second panel hingedly coupled to the display unit. The second panel is positionable at an adjustable angle with respect to the first panel and the display unit projects an image onto the second panel. In this way the second panel reflects the image onto the first panel to facilitate the driver to view the image without taking their eyes off of the road while driving.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
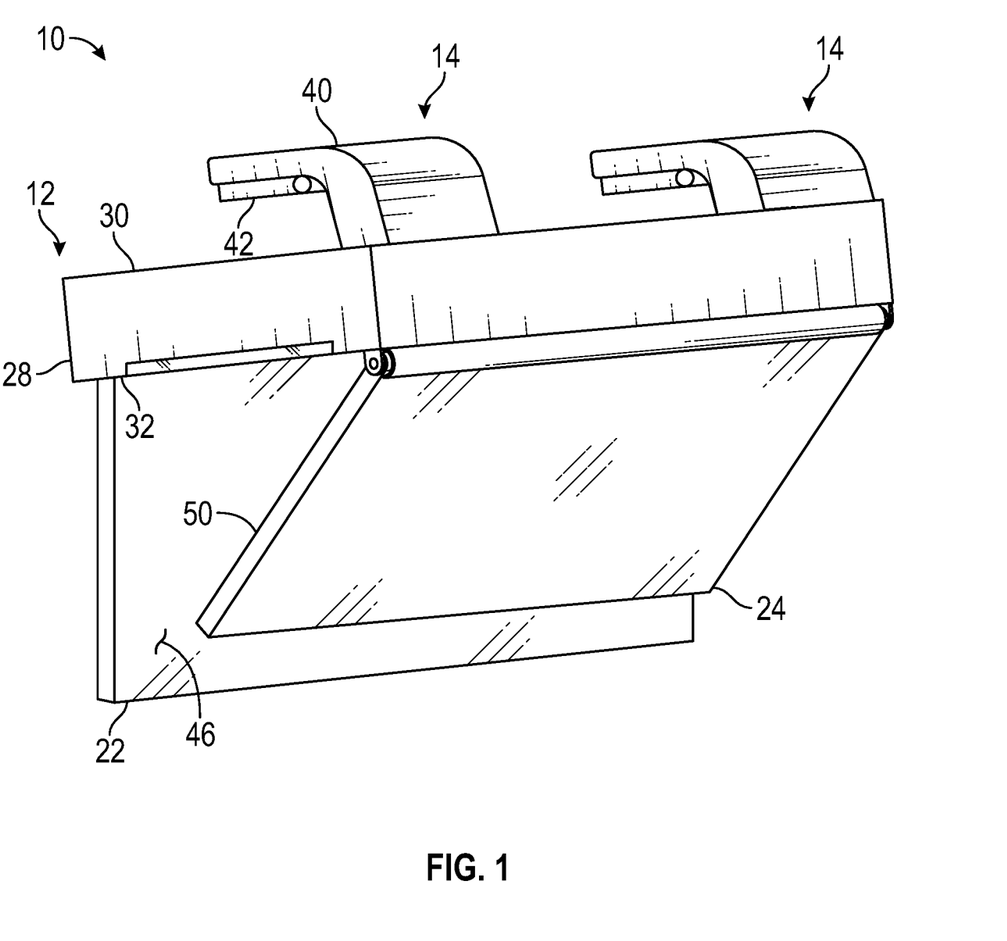
FIG. 1 is a front perspective view of a navigation display assembly according to an embodiment of the disclosure.
Figure 2:
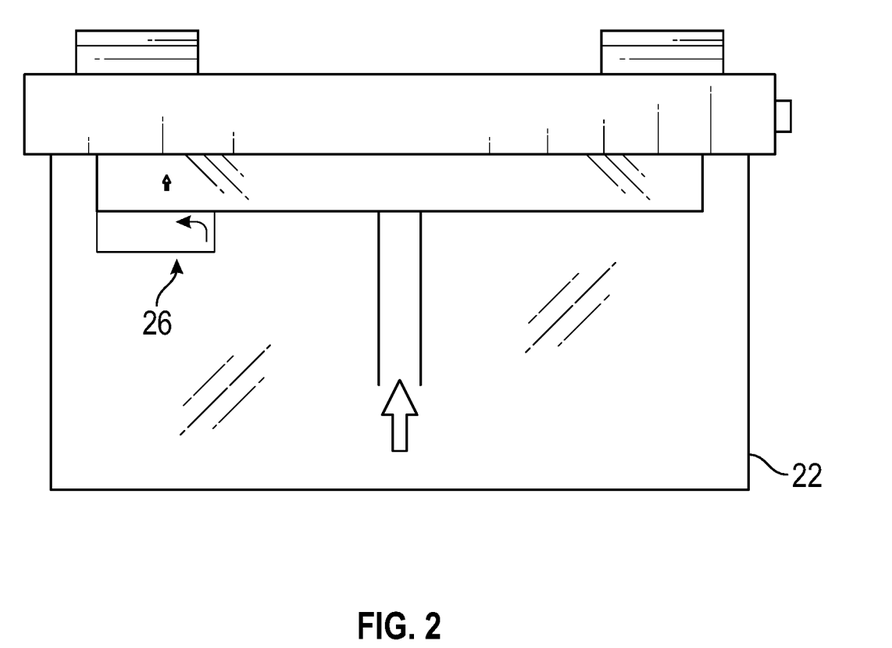
FIG. 2 is a front view of an embodiment of the disclosure.
Figure 3:
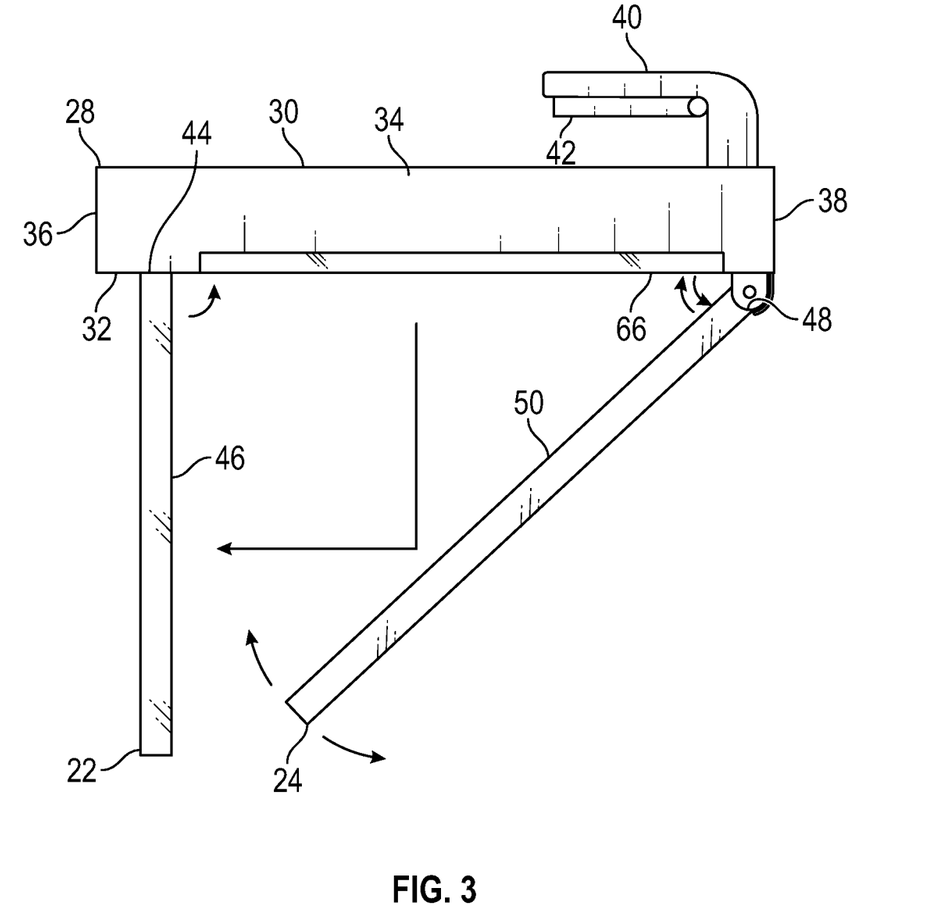
FIG. 3 is a left side view of an embodiment of the disclosure showing a second panel in a deployed position.
Figure 4:
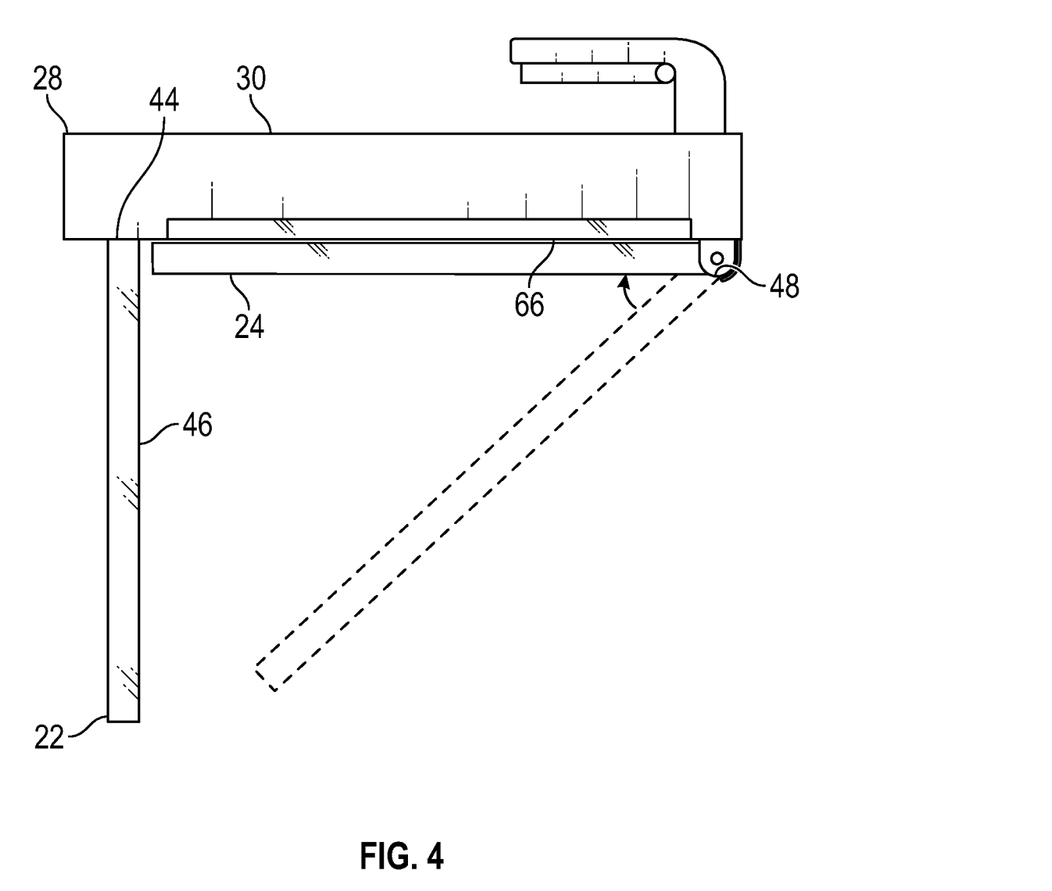
FIG. 4 is a left side view of an embodiment of the disclosure showing a second panel in a stored position.
Figure 5:
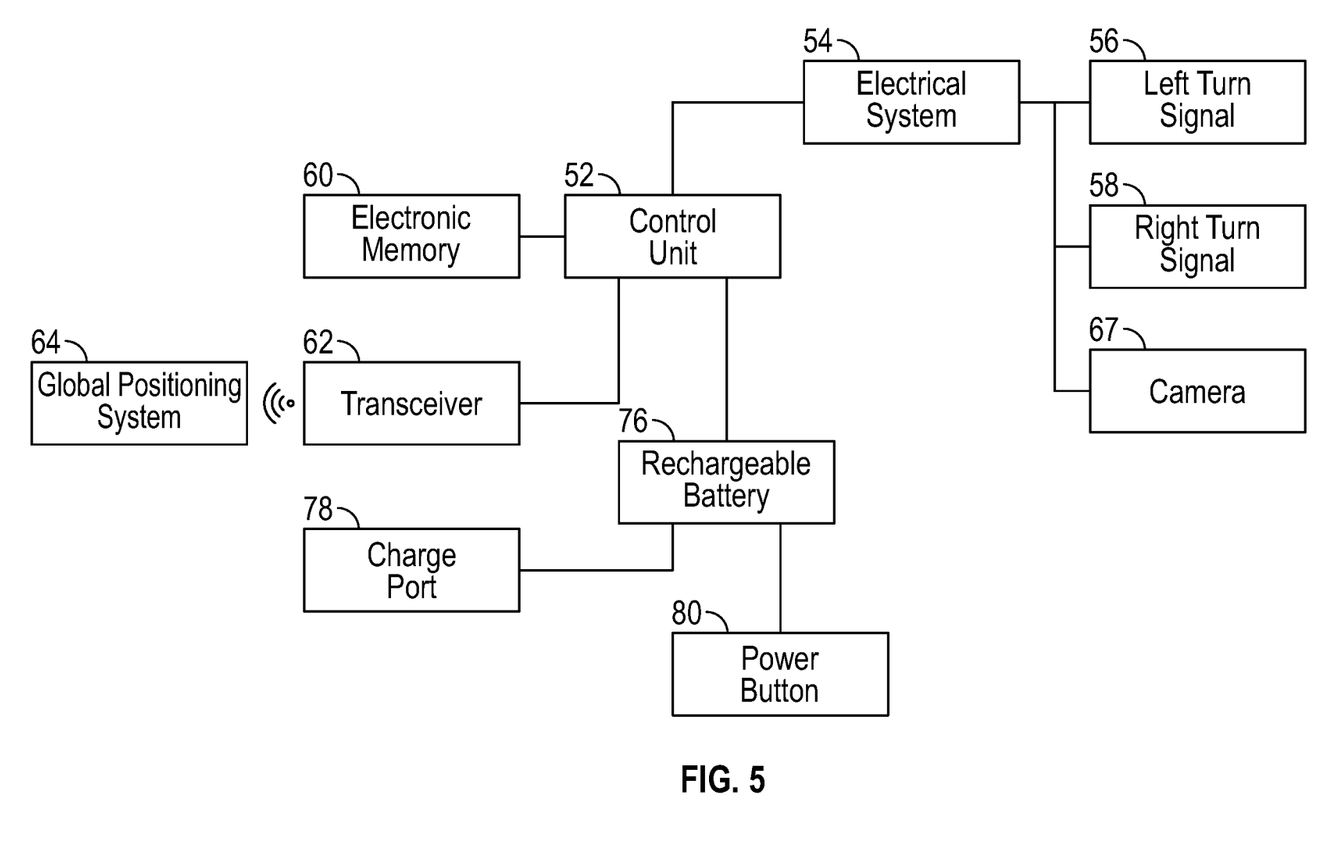
FIG. 5 is a schematic view of an embodiment of the disclosure.
Figure 6:
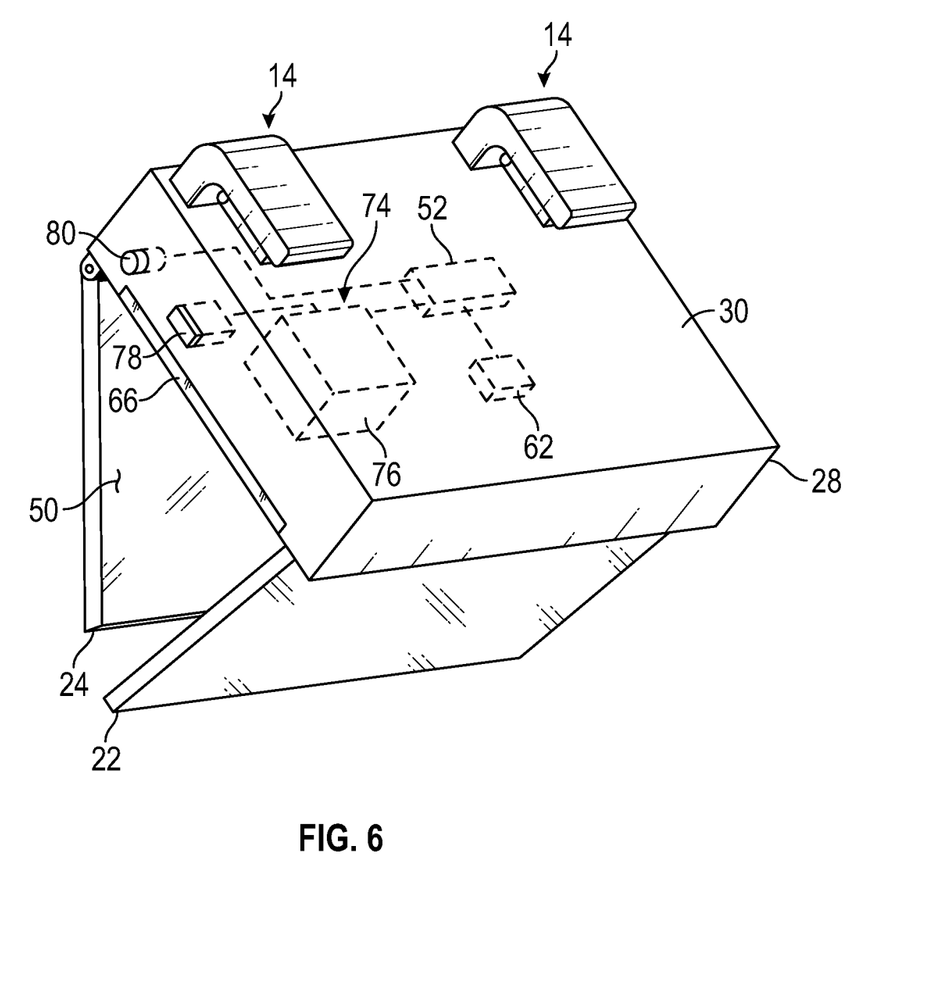
FIG. 6 is a perspective phantom view of an embodiment of the disclosure.
Figure 7:
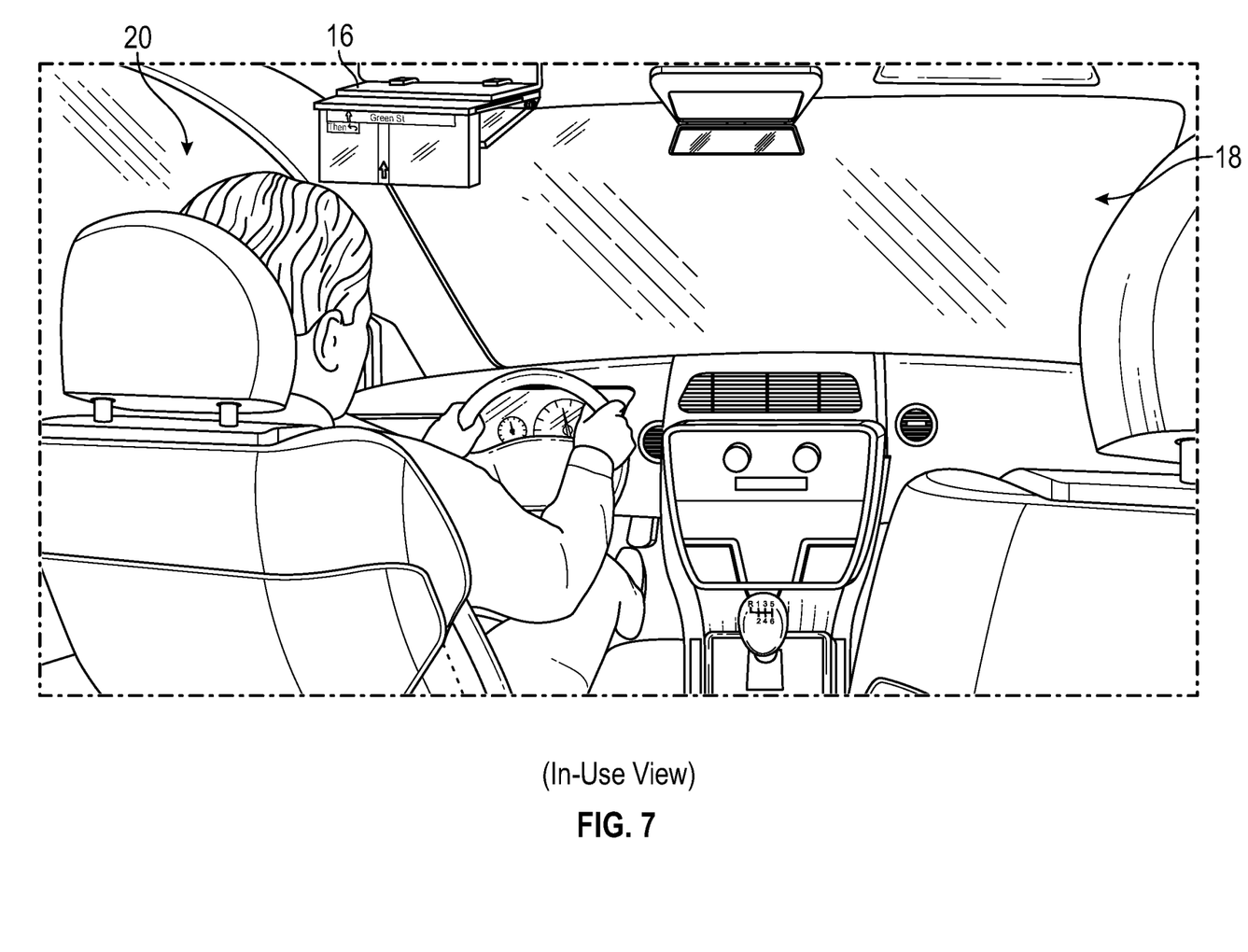
FIG. 7 is a perspective in-use view of an embodiment of the disclosure.
Figure 8:
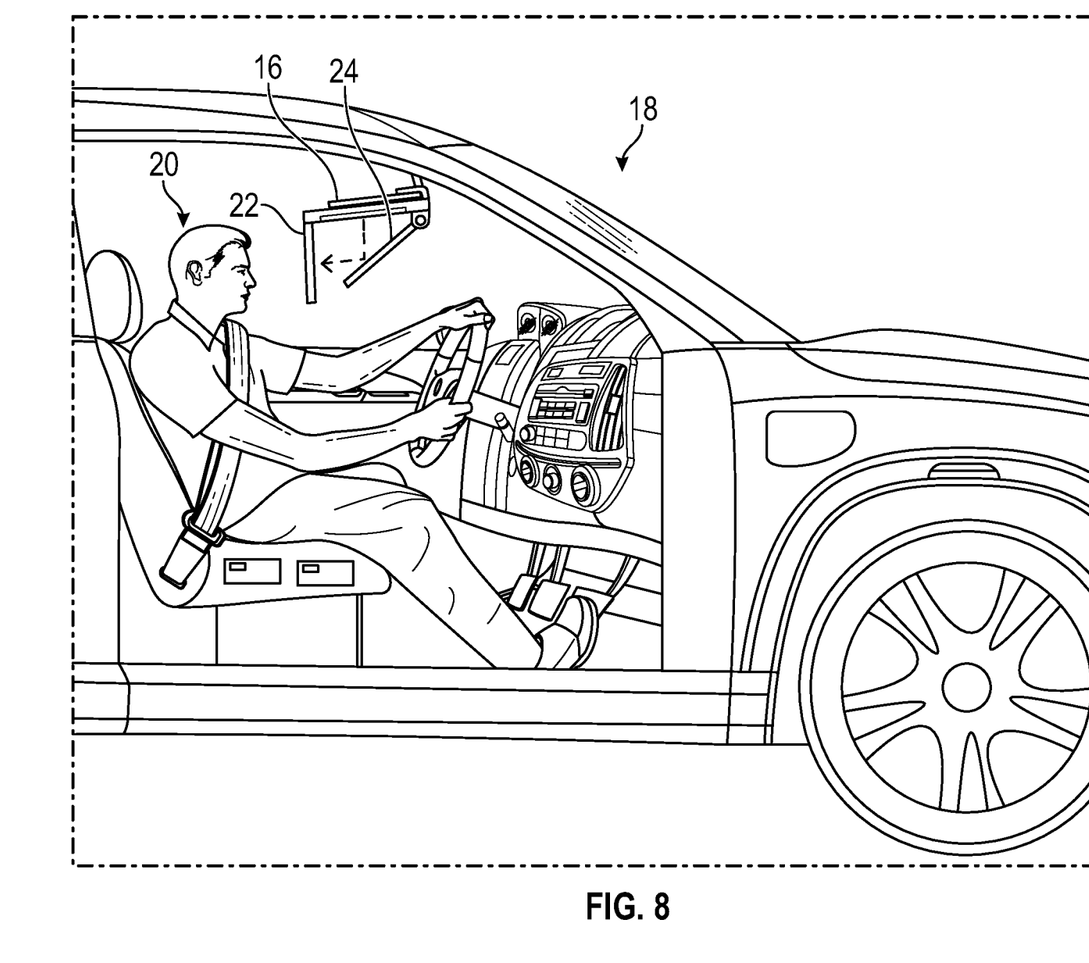
FIG. 8 is a right side in-use view of an embodiment of the disclosure.
Figure 9:
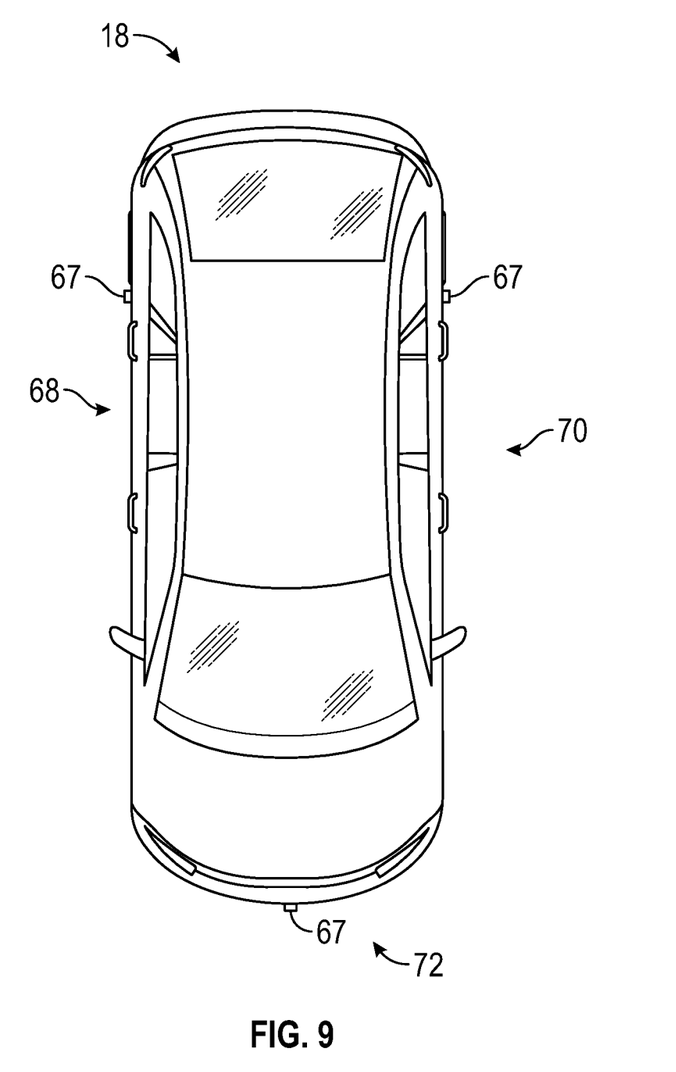
FIG. 9 is a top view of a vehicle of an embodiment of the disclosure.

With reference now to the drawings, and in particular to FIGS. 1 through 9 thereof, a new navigation device embodying the principles and concepts of an embodiment of the disclosure and generally designated by the reference numeral 10 will be described.

As best illustrated in FIGS. 1 through 9, the navigation display assembly 10 generally comprises a display unit 12 that has a pair of clamps 14 that can releasably engage a visor 16 in a vehicle 18. In this way the display unit 12 can be positioned in front of a driver 20 of the vehicle 18. The vehicle 18 may comprise a passenger vehicle, a cargo vehicle or any other type of motorized vehicle that is driven on public roadways. The display unit 12 includes a first panel 22 extending downwardly from the display unit 12 such that the first panel 22 is aligned with the driver's 20 line of sight. The display unit 12 includes a second panel 24 that is hingedly coupled to the display unit 12 thereby facilitating the second panel 24 to be positioned at an adjustable angle with respect to the first panel 22. In this way the second panel 24 can be aligned with the driver's 20 line of sight. The display unit 12 projects an image 26 onto the second panel 24 thereby facilitating the second panel 24 to reflect the image 26 onto the first panel 22. In this way the display unit 12 facilitates the driver 20 to view the image 26 without taking their eyes off of the road while driving.

The display unit 12 comprises a housing 28 which has a top wall 30, a bottom wall 32 and an outer wall 34 extending between the top wall 30 and the bottom wall 32 and the outer wall 34 has a front side 36 and a back side 38. Each of the clamps 14 is positioned on the top wall 30 at a point that is aligned with the back side 38. Each of the clamps 14 comprises a first member 40 which curves toward the front side 36 of the outer wall 34 and each of the clamps 14 includes a second member 42 that is pivotally attached to the first member 40. Furthermore, the second member 42 associated with each of the clamps 14 is biased to abut the first member 40 associated with a respective clamp 14 thereby facilitating the second member 42 to compress the visor 16 against the first member 40.

The first panel 22 has a top end 44 that is attached to the bottom wall 32 at a point that is located adjacent to the front side 36 of the outer wall 34. The first panel 22 has a rear surface 46 that is directed toward the back side 38 of the outer wall 34 and the second panel 24 has an upper edge 48 that is pivotally attached to the bottom wall 32. The second panel 24 is positionable in a stored position having a forward surface 50 of the second panel 24 resting against the bottom wall 32. Additionally, the second panel 24 is positionable in a deployed position having the forward surface 50 being oriented at an angle with the bottom wall 32 such that the second panel 24 extends toward the first panel 22. The forward surface 50 is treated with a reflective material such that the forward surface 50 reflects light toward the rear surface 46 of the first panel 22 when the second panel 24 is in the deployed position. The first panel 22 may be comprised of a translucent material, including but not being limited to glass or plastic, such that the first panel 22 facilitates light to pass through the first panel 22. Furthermore, the first panel 22 may be treated with a tint to reduce the intensity of light that passes through the first panel 22. The second panel 24 is comprised of a translucent material, including but not being limited to glass or plastic, thereby facilitating light to pass through the second panel 24. In this way the first panel 22 is visible through the second panel 24 when the second panel 24 is positioned in the deployed position.

The display unit 12 includes a control circuit 52 that is integrated into the housing 28 and the control circuit 52 is in electrical communication with an electrical system 54 of the vehicle 18, with either an electrical cable or a wireless connection. The control circuit 52 receives a left turn input when a left turn signal 56 of the vehicle 18 is actuated, the control circuit 52 receives a right turn input when a right turn signal 58 of the vehicle 18 is actuated and the control circuit 52 receives a back up input when the vehicle 18 is backing. Additionally, the control circuit 52 includes an electronic memory 60 which stores data comprising a navigation program. The display unit 12 includes a transceiver 62 that is integrated into the housing 28 and the transceiver 62 is electrically coupled to the control circuit 52. The transceiver 62 is in wireless communication with a global positioning system 64 to receive a physical location of the vehicle 18 from the global positioning system 64. Furthermore, the transceiver 62 may comprise a radio frequency transceiver or the like that is commonly employed in global positioning systems.

The display unit 12 includes a display 66 that is integrated into the bottom wall 32 of the housing 28 and the display 66 is electrically coupled to the control circuit 52. The display 66 projects imagery 26 onto the forward surface 50 of the second panel 24 such that the imagery 26 projected onto the forward surface 50 is reflected onto the rear surface 46 of the first panel 22. In this way the imagery 26 is visible to the user. Additionally, the display 66 may comprise a liquid crystal display or other type of electronic display.

The imagery 26 comprises a navigational screen produced by the navigation program in the electronic memory to guide the driver 20 along a pre-determined route. The imagery 26 comprises images captured by a camera 67 on a left side 68 of the vehicle 18 when the control circuit 52 receives the left turn input. In this way the first panel 22 facilitates the driver 20 to see oncoming traffic from the left side of the vehicle 18. The imagery 26 comprising images captured by a camera 67 on a right side 70 of the vehicle 18 when the control circuit 52 receives the right turn input to facilitate the driver 20 to see oncoming traffic from the right side of the vehicle 18. Furthermore, the imagery 26 comprises images captured by a camera 67 on a back side 72 of the vehicle 18 when the control circuit 52 receives the back up input to facilitate the driver 20 to see behind the vehicle 18. Each camera 67 on the vehicle 18 may be a factory installed camera or each camera 67 on the vehicle 18 may be an aftermarket camera installed by the driver 20.

A power supply 74 is integrated into the housing 28 and the power supply 74 is electrically coupled to the control circuit 52. The power supply 74 comprises a rechargeable battery 76 that is positioned within the housing 28 and the rechargeable battery 76 is electrically coupled to the control circuit 52. A charge port 78 is recessed into the outer wall 34 of the housing 28 thereby facilitating the charge port 78 to insertably receive a charge cord of a charger. The charge port 78 is electrically coupled to the rechargeable battery 76 for charging the rechargeable battery 76. The power supply 74 includes a power button 80 that is movably integrated into the outer wall 34 of the housing 28. The power button 80 is electrically coupled to the control circuit 52 for turning the control circuit 52 on and off.

In use, the clamps 14 are attached to the visor 16 such that the first panel 22 is positioned slightly above the driver's 20 line of sight. The second panel 24 is pivoted into the deployed position at an angle that facilitates the imagery 26 projected onto the forward surface 50 of the second panel 24 to be reflected onto the rear surface 46 of the first panel 22. In this way the driver 20 can view the imagery 26 on the first panel 22 without having to look away from the road while the driver 20 is driving the vehicle 18. Thus, the driver 20 can view navigational information in a safe manner while the driver 20 is driving the vehicle 18. Furthermore, the first panel 22 displays imagery 26 captured by a respective camera 67 when the driver 20 actuates the left turn signal, the right turn signal or places the transmission of the vehicle 18 in reverse. In this way the driver 20 can safely navigate the vehicle 18 with minimal risk of striking an object or a different vehicle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A navigation display assembly being mountable to a sun-visor in a vehicle thereby facilitating a driver of the vehicle to observe global positioning navigation information without taking their eyes off of the road while driving the vehicle, said assembly comprising:
    a display unit having a pair of clamps that can releasably engage a visor in a vehicle wherein said display unit is configured to be positioned in front of a driver of the vehicle, said display unit including a first panel extending downwardly from said display unit wherein said first panel is configured to be aligned with the driver's line of sight, said display unit including a second panel being hingedly coupled to said display unit thereby facilitating said second panel to be positioned at an adjustable angle with respect to said first panel wherein said second panel is configured to be aligned with the driver's line of sight, said display unit projecting an image onto said second panel thereby facilitating said second panel to reflect said image onto said first panel wherein said display unit is configured to facilitate the driver to view the image without taking their eyes off of the road while driving.

2. The assembly according to claim 1, wherein:
    said display unit comprises a housing having a top wall, a bottom wall and an outer wall extending between said top wall and said bottom wall, said outer wall having a front side and a back side;
    each of said clamps is positioned on said top wall at a point being aligned with said back side, each of said clamps comprising a first member curving toward said front side of said outer wall, each of said clamps including a second member being pivotally attached to said first member, said second member associated with each of said clamps being biased to abut said first member thereby facilitating said second member to compress said visor against said first member;
    said first panel has a top end being attached to said bottom wall at a point being located adjacent to said front side of said outer wall, said first panel having a rear surface being directed toward said back side of said outer wall; and
    said second panel has an upper edge being pivotally attached to said bottom wall, said second panel being positionable in a stored position having a forward surface of said panel resting against said bottom wall, said second panel being positionable in a deployed position having said forward surface being oriented at an angle with said bottom wall such that said second panel extends toward said first panel.

3. The assembly according to claim 2, wherein said forward surface of said second panel is treated with a reflective material wherein said forward surface is configured to reflect light toward said first panel when said second panel is in said deployed position.

4. The assembly according to claim 2, wherein said display unit includes:
    a control circuit being integrated into said housing, said control circuit being in electrical communication with an electrical system of said vehicle, said control circuit receiving a left turn input when a left turn signal of said vehicle is actuated, said control circuit receiving a right turn input when a right turn signal of said vehicle is actuated, said control circuit receiving a back up input when said vehicle is backing, said control circuit including an electronic memory storing data comprising a navigation program; and
    a transceiver being integrated into said housing, said transceiver being electrically coupled to said control circuit, said transceiver being in wireless communication with a global positioning system wherein said transceiver is configured to receive a physical location of said vehicle from said global positioning system.

5. The assembly according to claim 4, wherein said display unit includes a display being integrated into said bottom wall of said housing, said display being electrically coupled to said control circuit, said display projecting imagery onto a forward surface of said second panel such that said imagery projected onto said forward surface is reflected onto a rear surface of said first panel wherein said imagery is configured to be visible to the user.

6. The assembly according to claim 5, wherein:
    said imagery comprises a navigational screen produced by said navigation program in said electronic memory wherein said first panel is configured to guide the driver along a pre-determined route;
    said imagery comprises images captured by a camera on a left side of said vehicle when said control circuit receives said left turn input wherein said first panel is configured to facilitate the driver to see oncoming traffic from the left side of said vehicle;
    said imagery comprises images captured by a camera on a right side of said vehicle when said control circuit receives said right turn input wherein said first panel is configured to facilitate the driver to see oncoming traffic from the right side of said vehicle; and
    said imagery comprises images captured by a camera on a back side of said vehicle when said control circuit receives said back up input wherein said first panel is configured to facilitate the driver to see behind said vehicle.

7. The assembly according to claim 3, further comprising a power supply being integrated into said housing, said power supply being electrically coupled to said control circuit, said power supply comprising:
    a rechargeable battery being positioned within said housing, said rechargeable battery being electrically coupled to said control circuit;
    a charge port being recessed into said outer wall of said housing thereby facilitating said charge port to insertably receive a charge cord of a charger, said charge port being electrically coupled to said rechargeable battery for charging said rechargeable battery; and
    a power button being movably integrated into said outer wall of said housing, said power button being electrically coupled to said control circuit for turning said control circuit on and off.

8. A navigation display assembly being mountable to a sun-visor in a vehicle thereby facilitating a driver of the vehicle to observe global positioning navigation information without taking their eyes off of the road while driving the vehicle, said assembly comprising:
- a display unit having a pair of clamps that can releasably engage a visor in a vehicle wherein said display unit is configured to be positioned in front of a driver of the vehicle, said display unit including a first panel extending downwardly from said display unit wherein said first panel is configured to be aligned with the driver's line of sight, said display unit including a second panel being hingedly coupled to said display unit thereby facilitating said second panel to be positioned at an adjustable angle with respect to said first panel wherein said second panel is configured to be aligned with the driver's line of sight, said display unit projecting an image onto said second panel thereby facilitating said second panel to reflect said image onto said first panel wherein said display unit is configured to facilitate the driver to view the image without taking their eyes off of the road while driving, said display unit comprising:
  - a housing having a top wall, a bottom wall and an outer wall extending between said top wall and said bottom wall, said outer wall having a front side and a back side, each of said clamps being positioned on said top wall at a point being aligned with said back side, each of said clamps comprising a first member curving toward said back side of said outer wall, each of said clamps including a second member being pivotally attached to said first member, said second member associated with each of said clamps being biased to abut said first member thereby facilitating said second member to compress said visor against said first member, said first panel having a top end being attached to said bottom wall at a point being located adjacent to said front side of said outer wall, said first panel having a rear surface being directed toward said back side of said outer wall, said second panel having an upper edge being pivotally attached to said bottom wall at a point being located adjacent to said back side of said outer wall, said second panel being positionable in a stored position having a forward surface of said panel resting against said bottom wall, said second panel being positionable in a deployed position having said forward surface being oriented at an angle with said bottom wall such that said second panel extends toward said first panel, said forward surface being treated with a reflective material wherein said forward surface is configured to reflect light toward said first panel when said second panel is in said deployed position;
  - a control circuit being integrated into said housing, said control circuit being in electrical communication with an electrical system of said vehicle, said control circuit receiving a left turn input when a left turn signal of said vehicle is actuated, said control circuit receiving a right turn input when a right turn signal of said vehicle is actuated, said control circuit receiving a back up input when said vehicle is backing, said control circuit including an electronic memory storing data comprising a navigation program;
  - a transceiver being integrated into said housing, said transceiver being electrically coupled to said control circuit, said transceiver being in wireless communication with a global positioning system wherein said transceiver is configured to receive a physical location of said vehicle from said global positioning system;
  - a display being integrated into said bottom wall of said housing, said display being electrically coupled to said control circuit, said display projecting imagery onto said forward surface of said second panel such that said imagery projecting onto said forward surface is reflected onto said rear surface of said first panel wherein said imagery is configured to be visible to the user, said imagery comprising a navigational screen produced by said navigation program in said electronic memory wherein said first panel is configured to guide the driver along a pre-determined route, said imagery comprising images captured by a camera on a left side of said vehicle when said control circuit receives said left turn input wherein said first panel is configured to facilitate the driver to see oncoming traffic from the left side of said vehicle, said imagery comprising images captured by a camera on a right side of said vehicle when said control circuit receives said right turn input wherein said first panel is configured to facilitate the driver to see oncoming traffic from the right side of said vehicle, said imagery comprising images captured by a camera on a back side of said vehicle when said control circuit receives said back up input wherein said first panel is configured to facilitate the driver to see behind said vehicle; and
- a power supply being integrated into said housing, said power supply being electrically coupled to said control circuit, said power supply comprising:
  - a rechargeable battery being positioned within said housing, said rechargeable battery being electrically coupled to said control circuit;
  - a charge port being recessed into said outer wall of said housing thereby facilitating said charge port to insertably receive a charge cord of a charger, said charge port being electrically coupled to said rechargeable battery for charging said rechargeable battery; and
  - a power button being movably integrated into said outer wall of said housing, said power button being electrically coupled to said control circuit for turning said control circuit on and off.

* * * * *